United States Patent
Eagles et al.

[11] Patent Number: 6,158,576
[45] Date of Patent: Dec. 12, 2000

[54] ENDLESS BELT OR FABRIC FOR USE IN PROCESS CONTROL LOOP

[75] Inventors: Dana Burton Eagles, Sherborn, Mass.; William A. Luciano, Saratoga Springs, N.Y.; Jeffrey Scott Denton, Mendon; David A. Dunn, Hopedale, both of Mass.

[73] Assignee: Albany International Corp., Albany, N.Y.

[21] Appl. No.: 09/173,304

[22] Filed: Oct. 15, 1998

[51] Int. Cl.$^7$ .................................................. B65G 43/00
[52] U.S. Cl. .............................. 198/810.01; 198/810.02; 198/810.03
[58] Field of Search ..................... 198/810.01, 810.02, 198/810.03, 502.1, 502.4

[56] References Cited

U.S. PATENT DOCUMENTS

| | | | |
|---|---|---|---|
| 3,834,524 | 9/1974 | Ratz et al. | 198/810.02 |
| 3,899,071 | 8/1975 | Duffy | 198/810.02 |
| 4,296,855 | 10/1981 | Blalock | 198/810.02 |
| 5,096,044 | 3/1992 | Biebel | 198/810.03 |
| 5,248,027 | 9/1993 | Kluger et al. | 198/502.4 |
| 5,403,447 | 4/1995 | Jarvinen et al. . | |
| 5,413,680 | 5/1995 | Nunn . | |
| 5,434,878 | 7/1995 | Lawandy . | |
| 5,448,582 | 9/1995 | Lawandy . | |
| 5,614,063 | 3/1997 | Graf et al. . | |

FOREIGN PATENT DOCUMENTS

| | | | |
|---|---|---|---|
| 287874 | 10/1988 | European Pat. Off. | 198/810.03 |
| 360178111 | 9/1985 | Japan | 198/810.03 |
| WO 97/27360 | 7/1997 | WIPO . | |

OTHER PUBLICATIONS

Wash 'N Wear Photonics by Steven R. Biller Textile Rental, Mar. 1997 pp. 36–40.

*Primary Examiner*—Jospeh E. Valenza
*Attorney, Agent, or Firm*—Pitney, Hardin, Kipp & Szuch, LLP

[57] ABSTRACT

The present invention is directed to endless belts and fabrics for use in a process control loop which can be used in the production of the products specified in the specification. The belt is provided with means for emitting electromagnetic radiation upon excitation by an energy source. That is, the belt is provided with a sensor which emits electromagnetic radiation when excited by an energy source, such as an external one that is directed at the belt. A sensor is comprised of an electromagnetic radiation emitting compound dispersed within a matrix. The sensor may also contain a scattering material. The sensor can take the form of a filamentary material, coating or film that can then be incorporated on or in the belt. In operation, energy emitted from an energy source is directed at the belt. Upon excitation of the sensor by the energy, the sensor emits electromagnetic radiation, which is detected by a detector located nearby. Based upon the intensity and peak wavelength of the emission of electromagnetic radiation from the sensor, the machine operator can learn useful information about the operation of the belt and the conditions under which it is running.

22 Claims, 2 Drawing Sheets

ENDLESS BELT OR FABRIC FOR USE IN PROCESS CONTROL LOOP

FIELD OF THE INVENTION

The present invention is directed toward endless belts or fabrics used in a process control loop. At least a portion of the belt or fabric has a sensor that emits electromagnetic radiation when excited with energy. The belts are used as industrial process belts in the production of, among other things, wet laid products such as paper, paper board, and sanitary tissue and towel products; in the production of wet laid and dry laid pulp; in processes related to papermaking such as those using sludge filters, and chemiwashers; in the production of tissue and towel products made by through-air drying processes; in the production of corrugated box board and in the production of non-wovens produced by hydroentangling (wet process), melt blowing, spunbonding, and air laid needle punching. For purposes of the present application, all of the above products which are produced using industrial process belts will simply be referred to as the "product" or "products". Such industrial process belts include, but are not limited to non woven felts, transfer belts, calender belts, coater belts, pre-press belts, shoe press belts, embossing, and conveying products and support belts used in processes for producing non wovens, filtration fabrics and filtration cloths. The term "industrial process belts" also includes but is not limited to all other paper machine fabrics (forming, pressing and dryer fabrics) for transporting the pulp slurry through all stages of the papermaking process.

BACKGROUND OF THE INVENTION

While industrial process belts generally come in a wide variety of styles, they can generally be characterized as formed from a pattern of warp and shute yarns, which extend in the machine and cross machine direction. In another variant, belts are joined of spirally wound fibers or yarns, or in yet another variant, the belt may itself be produced from a spirally wound fabric strip. Some industrial belts can be single layer belts, or they may be multilayered. Some belts have one or more layers laminated together by processes such as needle punching, or held together by binder threads. Some belts, such as press fabrics, have nonwoven fiber attached by needling or hydroentangling. Any one of these belts may be coated or impregnated with a resin to impart certain characteristics to the belt or to modify existing characteristics. Belts used on papermaking machines are but one kind of industrial process belt. These belts are used in the forming, pressing, drying and finishing sections of a papermaking machine.

In the use of an industrial process belt, the operator of the machine would like to have information concerning the operating conditions of the belt and/or the product that is transported on the belt. For instance, it is important to place an accurate guide line upon the belt, since this guide line is used to determine the skew of the belt. While the belt runs on a machine, the cross machine direction filaments can skew, or in other words, bow. Skew is characterized by the bowing of the cross machine direction filaments. Skew can either be forward or backward with respect to the direction in which the belt runs. For instance, for a belt used to remove moisture from a paper product, the skew affects the permeability of the belt, with the permeability at the edges of the belt differing from the permeability in the center. Belt permeability is of great importance in the production of a wet laid product, such as a paper product, and hence the skew of the belt is of great interest to the machine operator.

A change in the shape of the skew can indicate to the operator that a problem may exist. Also, the skew can also be nonsymmetrical, with one edge of the belt being ahead of the other. This can be a signal that a belt carrying roll is out of parallel alignment in relation to the other carrying rolls supporting the belt. This can lead to belt instability or problems in guiding the belt, resulting in belt damage if the belt runs into the machine frame, causing loss of the belt and expensive machine downtime required to install a new belt. Moreover, the problem is complicated by high machine speeds. As machine speeds approach 7000 fpm, it is virtually impossible to view the shape of the skew, making accurate assessment of the guideline with the naked eye difficult, if not impossible.

It is also desirable to have a method to determine and monitor the speed at which the belt travels. By measuring and monitoring belt speeds, the machine operator could accurately determine and set the draw, which is the difference between the speed of adjacent or sequential belts or between a belt and another rotating element. In the paper making process, the speed of a belt increases towards the dry end of the machine, where paper sheet transfers involve open draws between adjacent belts. Because of the speed differential between adjacent belts, the sheet is tensioned as it passes from section to section, with the amount of tension being related to the draw.

Presently, the operator of the machine relies upon computer assistance in setting the draw. The information is taken from the drive elements of the machines within each section of the papermaking machine. It is believed that the accuracy and reliability of the information used in setting the draw could be improved if it were instead taken from the belts, rather than the drive elements.

Slippage is the speed differential between the belt and a given rotating element that contributes to the movement of the belt. Slippage may be an indicator of problems associated with running the belt. It is known that slippage between the belts and the rotating elements could adversely affect the accuracy of information taken from the speed of the drive elements, so drive speed is not always a reliable measure of belt speed. Also, checking belt speed against the rotational speeds of the support rolls, press rolls and/or dryer cans provide an assessment of slippage. Too much slippage may be due to either improper belt tension or imminent failure of a rotating element's bearing. Also, the indication of the drive roll speed given by the computer could be inaccurate due to miscalibration or some other error. Slippage could lead to catastrophic belt failure in which for instance, the belt is torn off the machine. Slippage may shorten belt life due to abrasive wear on the belt. In any event, it is a problem that could result in economic loss due to machine downtime and belt replacement.

It is also desirable to monitor the width of the wet laid or dry laid product that is being manufactured. For instance, in a wet laid process such as papermaking, the formed paper sheet shrinks in the cross-machine direction as it progresses through the sections of a papermaking machine.

It is also desirable to have a means for detecting breaks in the wet laid or dry laid product that forms on the belt. One existing method calls for sensing intensity differences in reflected light between the wet laid product and the conveying belt. This method is problematic in that there are added costs of coloring the entire belt, limitations on belt colors, and belt disposal problems that arise because of coloring.

It is further desirable to have a system for guiding belts. A system of this kind could determine if belts shift or undulate in the cross machine direction while running. If a belt running at high speed shifts its position in the cross machine direction, it will become misaligned, and at high speeds, it may run off the normal path into the machine frame, causing loss of the belt, expensive downtime, as well as being a safety hazard to personnel. One existing method for guiding the belt and preventing this condition employs paddles located at the edges of the belt in order to send a signal to a movable guide roll to guide the belt. However, physical contact between the paddles and the belt will cause the belt to wear or ravel at the edge.

The prior art shows that there have been attempts at providing belts which, due to some object that is on or within the belt, can be used in systems that provide information to the machine operator. U.S. Pat. No. 5,403,447 discloses a system in a press section of a papermaking machine for monitoring and control of the running of the press felts. In this system, detector devices detect an alignment stripe on the felt or felts.

The detectors include oscillation detectors that permit detection of the oscillation of press rolls or related components. When optical detectors are used, it is possible to determine the direction and kind of identification stripes which makes it possible to find out the running direction or state of tension of each felt. No information is provided on what kinds of materials can be used to form the stripes.

U.S. Pat. No. 5,413,680 discloses a method of detecting microbiological fouling of felts used in paper making machines. A felt suspected of containing microbiological deposits is contacted with iodonitrotetrazolium and then examined for a predetermined color change confirming the presence of bacteria on the felt. The felt assumes a red color in the presence of at least one million colony forming units of bacteria per gram of dry felt within thirty minutes after the iodonitrotetrazolium has contacted the felt.

U.S. Pat. No. 5,614,063 discloses an inductive edge detector system for paper machinery. The edge detector system consists of a continuous belt with an edge dope with metallic particles therein, and an inductive sensor connected to the guide device and adjacent the edge dope. The inductive sensor sends a signal to the guide device indicative of the location of the continuous belt. The guide device moves the continuous belt transversely relative to the running direction of the belt within the machine, dependent on the inductive sensor signal.

The edge dope is formed along the edge and includes a plurality of metal or metallic particles disposed therein. A further aspect of the invention described in the '063 patent is the ability to determine the amount of "stretch" of the continuous belt under loading conditions.

International publication no. WO 97/27360 discloses an industrial roll cover comprising a polymer matrix, the polymer matrix comprising at least one thermochromic material. The thermochromic materials of the reference ideally provide a reversible color change, generally brought about by heat which causes the color forming compound to melt and come in contact with an electron accepting material. This can be used to provide information on the operating temperatures of the fabric.

Certain compositions are known to emit laser light in response to excitation by energy from an external laser source. U.S. Pat. No. 5,448,582 discloses an optical gain medium and is a multi-phase system wherein: a first phase is an electromagnetic radiation emitting and amplifying phase; a second phase is an electromagnetic radiation scattering phase; and a third phase is a transparent matrix phase.

By example, the emission phase may consist of dye molecules, the scattering phase may consist of $Al_2O_3$ or $TiO_2$ particles, and the matrix phase may consist of a solvent such as methanol. A smallest dimension of a body comprised of the gain medium may be less than a scattering length associated with the scattering phase.

In one specific embodiment of U.S. Pat. No. 5,448,582 laser-like activity is generated in a laser excited methanol solution containing a dye, such as rhodamine, and high index contrast nanoparticles, such as $TiO_2$ or $Al_2O_3$. This system is also disclosed in U.S. Pat. No. 5,434,878. This gain medium exhibits many of the properties of an efficient laser source, and has a nearly thresholdless input-output behavior. A laser-like activity is intended to encompass a condition wherein a well defined excitation causes the output linewidth of the emission to be narrowed.

As set forth in U.S. Pat. No. 5,448,582 nearly thresholdless laser-like behavior is achieved in a strongly scattering optically pumped dye-methanol solution containing colloidal $TiO_2$ or $Al_2O_3$ nanoparticles. The emission from the optically pumped high gain colloidal medium is shown to exhibit a slope change in its linear input-output characteristics above a critical pump pulse energy. The change in slope is accompanied by a significant narrowing of the output spectral linewidth, with a bichromatic spectrum appearing at high pump energies with some dyes. Excitation of the colloidal medium with 80 picosecond pulses at 532 nm was found to result in an emission which was shorter than a 300 picosecond time resolution of an optical detection system, thus substantiating the occurrence of laser-like behavior and not mere fluorescent behavior.

A fiber monofilament or yarn exhibiting the properties of the aforementioned system is known in the art. These fibers or monofilaments are comprised of laser dyes and scattering particles contained within a polymer host. (*Textile Rental*, March 1997, p. 36–40). Suitable scattering particles and hosts are titania and nylon 6, respectively. Such fibers, when included in linens, provide a means of coding, tracking and preventing linen loss. The incorporation of the multi-phased system has also been incorporated into a coating or paint, making it possible to apply coatings having laser-like properties.

SUMMARY OF THE INVENTION

It is an object of the invention to provide an endless belt or fabric for use in a process control loop.

It is an object of the present invention to provide a means for accurate identification of the guide line of a belt.

It is an object of the invention to provide a means of accurately assessing the skew of the belt.

It is an object of the invention to provide an accurate means of determining the speed of a running belt.

It is an object of the invention to provide a means of monitoring the degree of slippage of a belt.

It is an object of the invention to provide an accurate means of determining the degree of shrinkage of products, such as paper products, during operations such as papermaking.

It is a further object of the invention to provide a contactless guide system for the belt.

It is a further object of the invention to provide a means for determining whether there are breaks in the product that is formed on the belt.

Other objects of the invention will become apparent from the following disclosure.

The present invention is directed to endless belts and fabrics for use in a process control loop which can be used in the production of the products set forth above. The belt is provided with means for emitting electromagnetic radiation upon excitation by an energy source. That is, the belt is provided with a sensor which emits electromagnetic radiation when excited by an energy source, such as an external one that is directed at the belt. A sensor is comprised of an electromagnetic radiation emitting compound dispersed within a matrix. Fluorescent, phosphorescent, and laser dye compounds are suited for use in the sensor as the electromagnetic radiation emitting compound. Other materials, such as compounds of the lanthanide series and fluorescent semiconductor materials, are suited for use as the electromagnetic radiation emitting compound, and can be dispersed within a matrix. Laser dyes typically have a high quantum efficiency and are excitable at wavelengths of common excitation. These compounds are incorporated within a matrix material such as thermoplastic or thermoset polymers. The sensor can take the form of a filamentary material, coating or film that can then be incorporated on or in the belt. "Filamentary material", as used herein, refers to fibrous materials such as monofilaments, multifilament fibers, bicomponent fibers, staple fibers, and other yarn types known in the art. Filamentary sensors can be incorporated into the belts by techniques such as weaving, needling, hydroentangling, etc.

In operation, energy emitted from an energy source is directed at the belt. Upon excitation of the sensor by the energy, the sensor emits electromagnetic radiation, which is detected by a detector located nearby. Based upon the intensity and peak wavelength of the emission of electromagnetic radiation from the sensor, it is possible for the machine operator to learn useful information about the operation of the belt and the conditions under which it is running, such as the belt velocity, belt alignment, degree of belt wear, belt temperature, pH, and sheet conditions.

For instance, the operator can ascertain and monitor the guide line, i.e., shape of the skew of the belt and/or the speed of the belt. Also, if a product such as a wet laid product is being manufactured on the belt, the operator can ascertain and monitor whether during manufacture the product has changed dimensions, torn, become damaged, or broken.

The number of sensors on a particular belt, the location(s) thereof, and the arrangement(s) thereof, are dependent upon the kind or kinds of information to be determined from the emission of electromagnetic radiation. In other words, the kind or kinds of information to be determined dictate the positioning of the sensors, and the directionality of the sensors with respect to the machine on which the belt runs. With respect to directionality, the sensor or sensors may be placed in the machine direction, cross machine direction or in a selected direction or pattern on or in the belt, depending on the information to be determined. The sensors can be located at several positions on the belt so that different kinds of information can be collected.

While the present invention is described in relation to industrial process belts, it should be understood that it has application to all kinds of conveyor belts. For instance, the techniques described herein for determining the speed of an industrial process belt can be applied to a conveyor belt used in other kinds of applications.

DETAILED DESCRIPTION OF THE PREFERRED EMBODIMENTS

Figure 3:
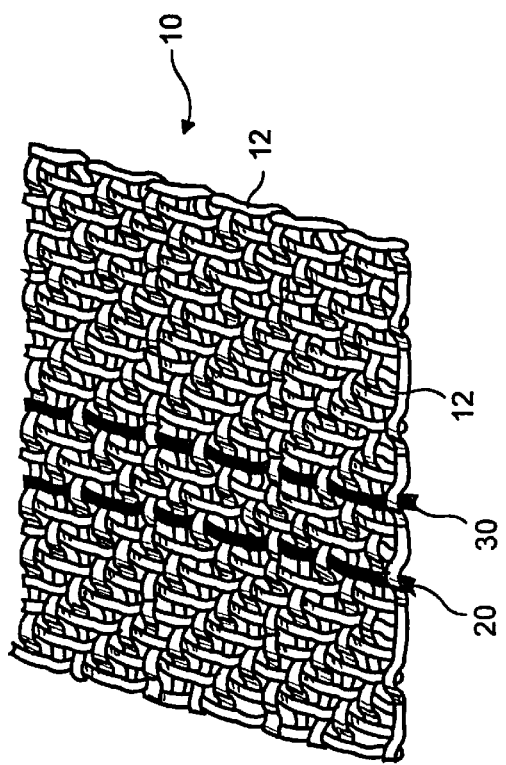
FIG. 3 depicts a second embodiment of the belt.

The present inventors have identified electromagnetic radiation emitting compounds which, upon excitation with energy from an energy source, exhibit a measurable and detectable response. Because of this feature, these compounds can perform in sensors in which they emit electromagnetic radiation when excited by an energy source. When placed on a belt, they can provide information about the belt, the product which is formed on the belt, and the environment which the belt is subjected to while it runs. As will be explained below, the kinds of information to be determined in the process control loop determines the number of sensors that are incorporated into the fabric and their relative location on the fabric. Merely exemplary of the kinds of information to be determined are things related to fabric location and its dimensions (position, wear, and speed) and fabric operating environment (pH and temperature). Also, the kind of information to be determined influences whether to select a sensor that provides a stable signal that is substantially constant in the signal that it produces, or whether to select a sensor which provides a signal that measurably changes in response to its environment. The former is suited to providing information concerning the fabric location and its dimensions, for instance, fabric alignment and fabric speed. The latter is suited for providing information concerning the fabric operating environment, for instance, parameters such as pH, and temperature.

Examples of compounds suitable for use in the sensors of the preferred embodiments include dyes such as rhodamine, pyromethene, fluorescein, sulforhodamine, phenoxazone, kiton red, and eosin Y spirit, as well as lanthanide compounds and fluorescent semiconductor materials.

These sensors can be described as a gain medium comprised of a multi-phase system wherein: a first phase is an electromagnetic radiation emission phase; a second phase is an electromagnetic radiation scattering phase; and a third phase is a transparent matrix phase. By example, the emission phase may consist of dye molecules, the scattering phase may consist of high contrast particles, and the matrix phase may consist of a polymer such as polyamide, polyester, polyolefin, polyetherketones, polyketones, fluoropolymers, polyphenylene sulfides or acrylics. The gain medium may be in the form of a coating, film, or filamentary material. Particularly, filamentary sensors can be formed by conventional solution or melt extrusion processes in which the dye, the scattering particles, and polymer are extruded together into filamentary materials. However, for certain polymers, such as polyamide, polyesters, and acrylics, fibers containing $TiO_2$ are commercially available and the first phase may be incorporated into these materials by dyeing.

One class of fluorescent dyes suited for use in the present invention are laser dyes. Laser dyes are described in U.S. Pat. No. 5,448,582, and U.S. Pat. No. 5,434,878, each of which is incorporated herein by reference. The laser means described in these references exhibit an output emission at input pump energy above a threshold level.

The sensor signal can be varied by the incorporation of a scattering component within the sensor. Suitable scattering materials include titanium dioxide and aluminum oxide, as provided for in U.S. Pat. No. 5,448,582. It is demonstrated that the incorporation of a scattering material causes the bandwidth of the sensor signal to narrow and to increase the signal intensity. These improvements are shown in U.S. Pat. No. 5,448,582.

The matrix material used in the sensors of the present invention can be any thermoplastic or thermoset material suitable for use in making filamentary materials, films and coatings. Filaments, films, and coatings may be produced by any of the processes and methods known to the skilled artisan.

To insure uniform distribution of the electromagnetic radiation emitting compound, matrix, and, if employed, scattering material within the sensor, the compound and scattering material can be dispersed within the matrix material by known techniques, such as melt processing, solubilizing the sensor within the matrix material, and textile dying methods. Dispersion within the matrix is desirable to insure uniform distribution of the materials at selected concentrations in order to avoid concentration quenching effects.

The electromagnetic radiation emitting compound and scattering materials can be incorporated into a polymeric resin which can be formed into a filament or film. The compound and scattering media could be compounded as a concentrated masterbatch for dry blending with virgin resin at the appropriate levels prior to extrusion. The electromagnetic radiation emitting compound could be compounded as a concentrated masterbatch into a resin supplied with an appropriate concentration of scattering media. The electromagnetic radiation emitting compound and scattering media could be compounded at the final concentration with no further dilution required prior to extrusion. The electromagnetic radiation emitting compound could be compounded into a resin containing an appropriate concentration of scattering media at a level requiring no further dilution prior to extrusion. The electromagnetic radiation emitting compound and scattering media could be dry-blended with virgin resin prior to extrusion. The electromagnetic radiation emitting compound could be dry-blended with resin containing the appropriate level of scattering media prior to extrusion.

Whether the prepared resin is a diluted masterbatch or a dry-blend, it can be extruded into fibrous form using known methods. The fibers could be monofilaments, either round or shaped in cross-section, or multifilament yarns, also round or shaped in cross-section.

Industrial process belts operate in harsh environments. For this reason, it may be desirable to improve sensor durability by encapsulation. For example, where the electromagnetic radiation emitting compound is included within a filamentary material, the filamentary material may be encapsulated in a coating or film that provides improved durability to the sensor.

The sensors used in the present invention emit electromagnetic radiation at frequencies that depend upon the properties of the electromagnetic radiation emitting compound. The peak emission wavelength is dependent upon the selected electromagnetic radiation emitting compound which controls the output of the sensor. Sensors of differing peak emission wavelengths can be used on a single conveyor belt, which could be useful in situations where more than one kind of information is to be determined. Electromagnetic radiation emitting compound selection is one way in which to control the output of the sensor.

In order to receive multiple kinds of information, such as more than one parameter associated with the running of the belt (e.g. belt speed) or a condition of the operating environment (e.g. temperature), a plurality of sensors or groups of sensors can be provided on the belts. The sensors can be differentiated from each other by the intensity of the signal which they emit when excited by energy from an energy source, or can be differentiated from each other by the wavelength of the signal. Sensors can also be differentiated based on both wavelength and intensity. For instance, a first sensor, having a selected emission intensity and/or wavelength, or a first group of sensors each having a selected emission intensity and/or wavelength, can be positioned on the belt to provide information on a first process parameter, such as belt speed. A second sensor, having a selected emission intensity and/or wavelength, or a second group of sensors each having a selected emission intensity and/or wavelength, can be positioned on the belt to provide information on a second process parameter, such as the temperature of the belt. Thus, by preselecting the intensity and wavelength of the sensor signal output, it is possible to produce a belt that can provide more than one kind of information that is useful in a process control loop.

Where a group of sensors provide information about a particular process parameter, the sensors of the group may have the same emission intensity, emission wavelength, or both, of the other sensors of the group. Likewise, where a group of sensors provide information about a particular process parameter, the sensors of the group may not have the same emission intensity, emission wavelength, or both, of the other sensors of the group. However, it may be advantageous to have each sensor of the group emit at the same intensity and/or bandwidth, in order to reduce the overall number of detectors required by the process control loop, or to otherwise facilitate the processing of the information provided by the sensor emissions.

Figure 1:
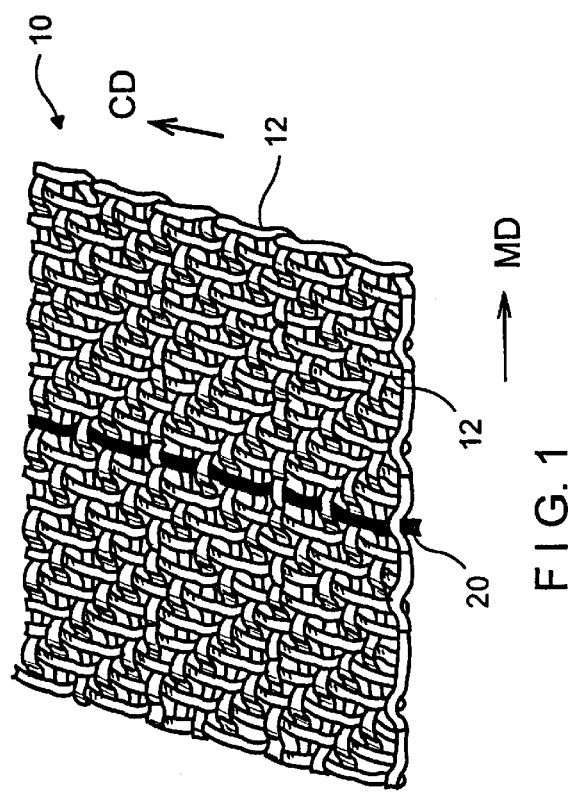
FIG. 1 depicts an embodiment of a belt of the present invention.

FIG. 1 depicts an industrial process belt 10 comprised of filaments 12 that extend in the machine direction and cross machine direction. The belt shown in FIG. 1 is a woven belt, but as with all other belts described herein, it may be of another construction such as non-woven, spirally wound fiber or fabric, or constructed in any other manner known by the skilled artisan. The belt has sensors 20 extending in its cross machine direction. Where the sensor 20 is a filament or fiber, the sensors may be incorporated into the belt 10 in the cross machine direction during weaving.

The embodiment depicted in FIG. 1 provides an accurate and reliable guide line for the belt. As indicated previously, the guide line is used by the machine operator to assess the skew of the belt, which affects permeability. Guide lines today consist of applying a visible dye in at least one CD band. This band can be up to 12 inches wide (i.e.—in the machine direction) so that it can be viewed by an operator while the belt is running. At speeds approaching 7000 fpm, a guide line on a 20 m long belt will make over 100 passes per minute. Viewing the guide line under such conditions is extremely difficult, if not impossible. The difficulty is complicated by the fact that paper machines have typically as many as twelve belts operating at once. It is impossible to see all these belts simultaneously. The sensor 20 of the belt is the guide line, and thus could be activated by a first light source 90 emitting energy of a first wavelength $\lambda_1$. First source 90 can be any energy source which effects the emission of electromagnetic radiation from the sensors of the present invention. Energy sources include: lasers, flash lamps, and high intensity continuous light sources.

Figure 2:
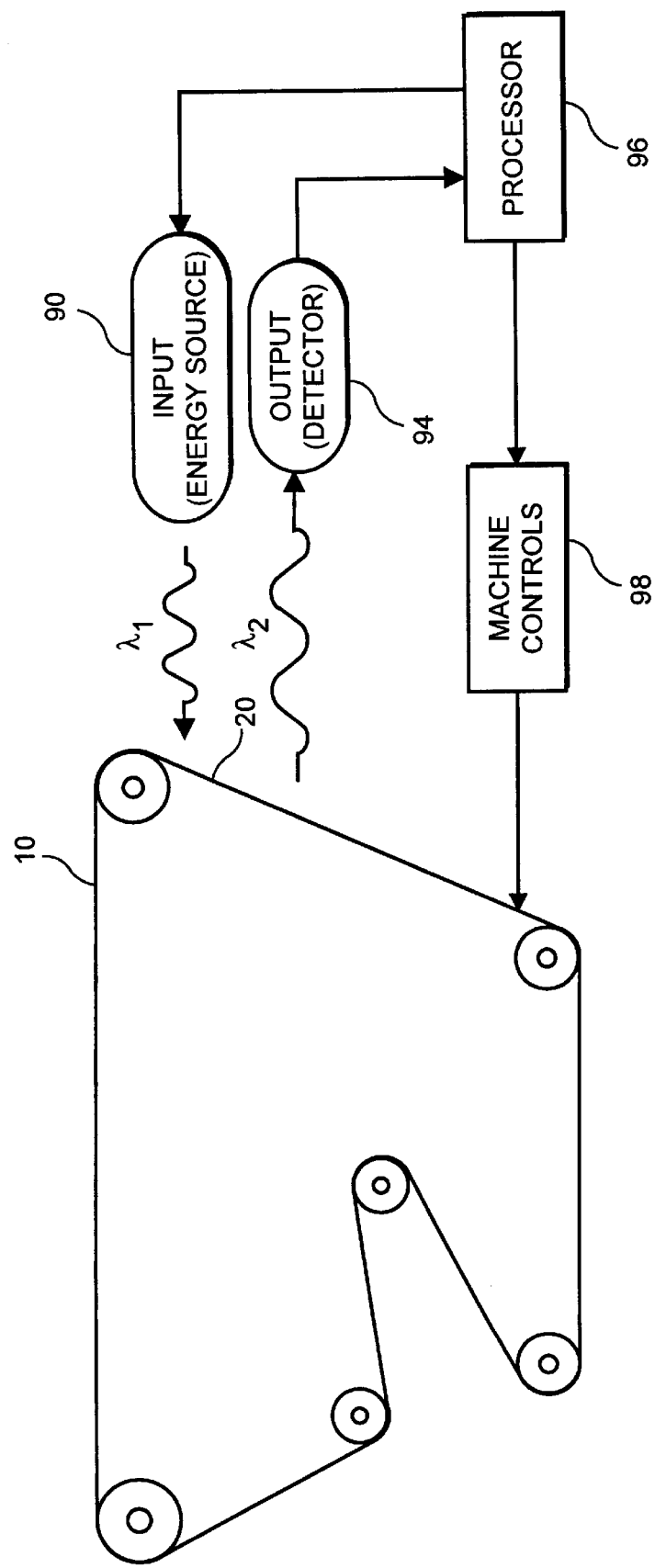
FIG. 2 depicts the apparatus of the present invention.

In effect, the guide line is the energy emitted from the sensors 20 of the belt 10, with the emitted energy having a wavelength $\lambda_2$. See FIG. 2. The energy emitted from the sensors 20 could be received by a full spectrum detector 94 or a detector fitted with a filter or other means to pass only wavelength $\lambda_2$. The output of the detectors are connected to a control unit 96 that generates an output signal in response to a detection of the wavelength $\lambda_2$. Control unit 96 controls the machine controllers 98. Under current practice, the guide line cannot be viewed at high machine speeds. The present invention provides a means for determining the exact amount of belt skew, which is used in determining how the belt is to be run on the machine.

Furthermore, this embodiment can provide information on the belt length at a specific running tension. That is, if the machine drive speed or belt speed is known, a measurement of the time for a single yarn or filament to pass by the same point in the process can be used to measure time between passes. The time between passes can be used to calculate belt length at a specific running condition.

FIG. 3 depicts the belt as shown in FIG. 1, wherein a second sensor 30 extends in the cross machine direction. The second sensor 30 is placed at a predetermined distance from the first sensor and may or may not emit energy at the same wavelength or intensity as the first sensor. If the distance between the first sensor and the second sensor has been accurately measured while the belt is under tension, belt speed can be determined using the apparatus of FIG. 2 by determining the difference in time between the emission of the first sensor and the second sensor. Moreover, once the belt speed has been determined, it can be compared to the speeds of the drive elements of the machine in order to determine if belt slippage is occurring.

By using two or more sensors, time differences can be measured at several points along the given section of the papermaking machine, providing information on whether the belt is accelerating or decelerating. Furthermore the draw, or ratio of speeds of adjacent belts can be accurately determined from the speeds of adjacent belts or adjacent sections of is the machine.

It should be evident that the above technique of measuring belt speed, and acceleration or deceleration is applicable to all kinds of conveyor belts. Accordingly, the teachings of the present application have application beyond industrial process belts.

Figure 5:
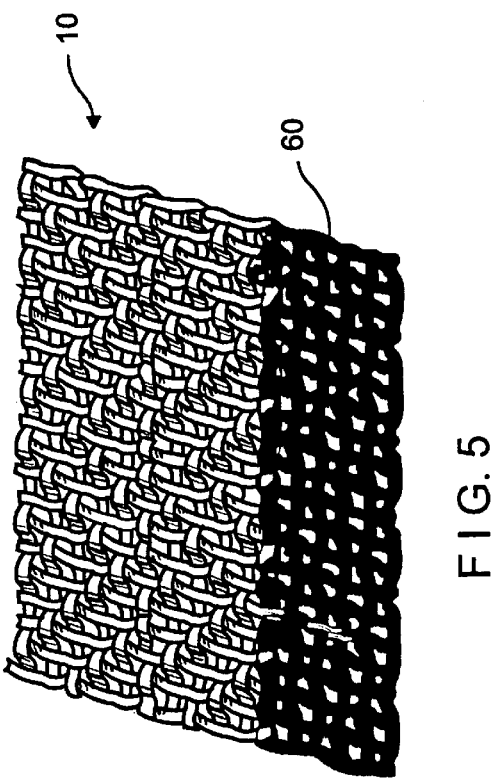
FIG. 5 depicts a belt having an edge coating.
Figure 4:
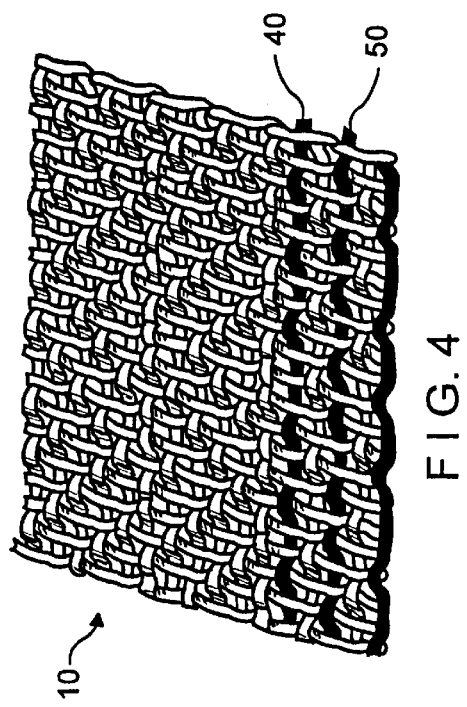
FIG. 4 depicts a third embodiment of the belt.

FIG. 4 shows a paper machine fabric 10 having a sensor 40 located on its surface that extends in the machine direction, running the entire length of the belt. Placing one or more sensors (i.e. sensors 40 and 50) that extend in the machine direction can provide information on paper sheet shrinkage when such sensors are located at the edges of the belt or near the edges of the belt. Alternatively, the sensor can be placed on the fabric as a coating 60. In FIG. 5, the coating 60 has been applied at the edge of the fabric 10. As the sheet shrinks, sensors on or near the edges of the belt are no longer covered by the sheet. The intensity of the energy emitted by the sensors would be greater after shrinkage than before it. In instances where the sheet is opaque, no laser-like energy will be emitted by the sensors until they are uncovered as a result of sheet shrinkage. Thus, if the distance from the edge of the belt to the sensors is known, sheet shrinkage can be determined by monitoring the emissions from the sensors located near the belt edge. This also provides a measurement of the distance between the edge of the paper sheet and the edge of the belt. Sheet shrinkage is a function of both draw (tension applied) and degree of water removal. For the vast majority of paper machines and grades, sheet shrinkage is to be minimized so as to maximize saleable tons. If the sheet shrinks, primarily at the edges, these heavy edges have to be trimmed off and repulped. Thus the time and energy to produce trim is wasted.

A sensor or array of sensors extending in the machine direction and cross machine direction for the entire length and width of the belt can provide the information necessary to determine whether the paper sheet has been damaged or broken. Energy will not pass through the sheet, or will pass through at a lesser intensity, where the sheet is continuous and unbroken. Locations of breaks will be evidenced by emissions, or higher intensity emissions, at those locations. This permits determination of the locations of breaks.

Sheet holes and tears are a sign of a malfunction in the paper machine such as a filled area in one of the papermaking belts. If undetected, these holes or tears will cause considerable paper product loss in the converting operations due to rejection of the product. In some printing operations, this can cause the loss of an entire production run. Holes/tears also lead to whole sheet breaks during converting or printing, adding to further losses in efficiency.

Breaks on the paper machine, especially at high speed, can be very troublesome. Breaks themselves lead to loss in production of good product. Troubleshooting the source of the break can be a difficult task. Knowing on which section of the machine or on which belt the break is occurring can reduce downtime and lost production.

A contactless guide system for the belt can be constructed by positioning a sensor in the machine direction of the belt. If the belt is running properly on the machine, the sensor in the machine direction of the belt should be parallel to the machine direction. If, however, the belt shifts in the cross machine direction, the sensor may not be parallel to the machine direction. Thus, by exciting the sensor with energy in order to generate a signal in the sensor, the operator of the machine can monitor the alignment of the machine direction sensor to insure that it remains parallel to the machine direction. If the operator determines that the signal no longer corresponds to the axis of the machine, he or she can realign the belt before the condition worsens. At high speeds, control and reaction to the problem must be virtually automatic, or the belt will be damaged or lost.

It should be understood that the foregoing represents some of the many ways in which sensors can be used as part of a belt in order to ascertain information concerning the operating conditions of the belt and/or product that is transported on the belt. Likewise, the following examples are merely intended to exemplify possible ways of producing sensors that can be used in the present application. The disclosure of these examples is not intended to limit the scope of the invention in any way.

EXAMPLE 1

A monofilament of 250 micron diameter was manufactured from a pre-compounded, pelletized resin consisting of 0.36 gm/lb. Rhodamine B Base and 4.35 gm/lb. titanium dioxide in a base resin of BASF ULTRAMID B3 polyamide 6. The monofilament was produced using standard techniques known in the art. The tensile strength, modulus, and elongation of the monofilament was found to be similar if not equal to the same properties as measured from a monofilament without added dye or scattering media manufactured by the same process. The monofilament exhibited a narrow bandwidth emission peaking at 587 nm when excited using Nd-YAG laser.

EXAMPLE 2

A monofilament of 300 micron diameter was manufactured from a pre-compounded, pelletized resin consisting of 0.55 gm/lb. Rhodamine 640 perchlorate and 1.6 gm/lb.

titanium dioxide in a base resin of BASF ULTRAMID B3 polyamide 6. The monofilament was produced using standard techniques as in Example 1. The monofilament exhibited a narrow bandwidth emission peaking at 620 nm when excited using a Nd-YAG laser.

EXAMPLE 3

A monofilament of 150 micron diameter was manufactured from a pre-compounded, pelletized resin consisting of 0.5 gm/lb. Rhodamine 590 perchlorate and 3.2 gm/lb. titanium dioxide in a base resin of BASF ULTRAMID B3 polyamide 6. The monofilament was produced using standard techniques as in Example 1. The monofilament exhibited a narrow bandwidth emission peaking at 558 nm when excited using a Nd-YAG laser.

EXAMPLE 4

A monofilament of 250 micron diameter was manufactured from a pre-compounded pelletized resin consisting of 0.4 gm/lb. Pyromethene 580 in a base resin of DuPont CRYSTAR 1995 PET polyester. The PET resin contains 0.5% titanium dioxide as a delusterant. The monofilament was produced using standard techniques as in Example 1. The monofilament exhibited a narrow bandwidth emission peaking at 555 nm when excited using a Nd-YAG laser.

EXAMPLE 5

A monofilament of 250 micron diameter was manufactured from a pre-compounded, pelletized resin consisting of 0.4 gm/lb. Pyromethene 597 in a base resin of DuPont CRYSTAR 1995 PET polyester. The PET resin contains 0.5% titanium dioxide as a delusterant. The monofilament was produced using standard techniques as in Example 1. The monofilament exhibited a narrow bandwidth emission peaking at 570 nm when excited using Nd-YAG laser.

EXAMPLE 6

Fibers of Examples 1, 2 and 3 were each fixed in parallel upon a rotating cylinder. A system consisting of a Nd-YAG laser, spectrometer, and computer was able to detect and distinguish emissions from the three fibers while the cylinder was rotating. The beam of the laser was directed toward the rotating cylinder. A fiber impinged with the laser beam would emit energy at the wavelength specific to the dye found within the fiber, and the computer software would compare the detected emission with predetermined values for the individual fibers. In this way the computer could distinguish the fibers, and thus relay information concerning the geometric location of the cylinder with respect to the detecting equipment.

EXAMPLE 7

Fibers of Examples 4 and 5 each were woven in parallel within a industrial fabric woven of monofilaments of similar size and material. The fabric was fixed upon a rotating cylinder. A system consisting of a Nd-YAG laser, spectrometer, and computer was able to detect and distinguish emissions from the fibers while the fabric was rotated. The beam of the laser was directed toward the rotating fabric. A fiber impinged with the laser beam would emit energy at the wavelength specific to the dye found within the fiber, and the computer software would compare the detected emission with predetermined values for the individual fibers. In this way the computer could distinguish the fibers, and thus relay information concerning the geometric location of the fabric with respect to the detecting equipment.

EXAMPLE 8

Fibers of both Example 4 and Example 5 were placed in a heated cell and the fluorescent signal was monitored with the temperature of the cell. The emission peak wavelength from both fibers was found to shift to longer wavelengths with increasing temperature. Over the temperature range of 25–100° C., a linear shift in peak wavelength of approximately 6 nm was observed. This shift was found to be reversible upon cooling of the monofilament and reproducible upon reheating.

We claim:

1. An endless belt or fabric for use in a process control loop comprised of a belt and at least one sensor, wherein the sensor is placed at a preselected position on or in the belt or fabric, and the sensor emits electromagnetic radiation of a first wavelength when excited by an energy source having a wavelength different from the first wavelength.

2. The endless belt or fabric of claim 1 wherein the belt is constructed of a filamentary material.

3. The endless belt or fabric of claim 1 wherein the sensor is further comprised of matrix material.

4. The endless belt or fabric of claim 3 wherein the matrix material is a film or coating.

5. The endless belt or fabric of claim 3 wherein the matrix material is a filamentary material selected from the group consisting of monofilaments, multifilament fibers, bicomponent fibers, and staple fibers.

6. The endless belt or fabric of claim 1 wherein the sensor is comprised of an electromagnetic radiation emitting compound selected from the group consisting of rhodamine, pyromethene, fluorescein, sulforhodamine, phenoxazone, kiton red, eosin Y spirit, lanthanides and fluorescent semiconductor materials.

7. The endless belt or fabric of claim 1 wherein the sensor is further comprised of a scattering material selected from the group consisting of titanium dioxide, aluminum oxide, and poly(vinylidine fluoride).

8. The endless belt or fabric of claim 6 wherein the sensor is further comprised of a scattering material selected from the group consisting of titanium dioxide, aluminum oxide, and poly(vinylidine fluoride).

9. The endless belt or fabric of claim 8 wherein the sensor is placed on or in the belt or fabric as a coating.

10. The endless belt or fabric of claim 8 wherein the sensor is placed on or in the belt or fabric as a film.

11. The endless belt or fabric of claim 8 wherein the sensor is incorporated in the belt or fabric as a filamentary material selected from the group consisting of monofilaments, multifilament fibers, bicomponent fibers, and staple fibers that is on or in the belt or fabric.

12. The endless belt or fabric of claim 1 wherein the belt is an industrial process belt.

13. An endless belt or fabric for use in a process control loop comprised of at least a first sensor and a second sensor, wherein the first and second sensors are placed at preselected positions on or in the belt or fabric, wherein the first and second sensors emit electromagnetic radiation when excited by energy emitted by an energy source, and wherein the emission of electromagnetic radiation of the first sensor is different from the electromagnetic radiation of the second sensor in its peak emission wavelength, intensity, or both.

14. The endless belt or fabric of claim 1 wherein the at least one sensor extends in the cross machine direction of the belt or fabric.

15. The endless belt or fabric of claim 13 wherein the first and second sensors extend in the cross machine direction of the belt or fabric.

16. The endless belt or fabric of claim 1 wherein the at least one sensor extends in the machine direction of the belt or fabric.

17. The endless belt or fabric of claim 13 wherein the first and second sensors extend in the machine direction of the belt or fabric.

18. The endless belt or fabric of claim 13 wherein the first sensor extends in the machine direction of the belt or fabric and the second sensor extends in the cross machine direction of the belt or fabric.

19. The endless belt or fabric for use in a process control loop comprised of a belt and at least one sensor placed at a preselected position on or in the belt or fabric wherein the sensor is a multi phase gain medium comprised of a first phase of said multi phase gain medium comprising means for spontaneously emitting electromagnetic radiation in response to an excitation from an energy source and for amplifying said emitted electromagnetic radiation by stimulated emission, and a second phase of said multi phase gain medium comprising means for scattering the emitted and amplified electromagnetic radiation for increasing the residence time of said electromagnetic radiation within said first phase, wherein said multi phase gain medium has a volume and wherein amplification of said electromagnetic radiation occurs in a portion of said volume of said multi phase gain medium, and a third phase that is substantially transparent at least at wavelengths of said stimulated emission, said third phase being commingled with said first phase and said second phase within said volume of said gain medium.

20. The endless belt or fabric of claim 3 wherein the sensor is comprised of an electromagnetic radiation emitting compound selected from the group consisting of rhodamine, pyromethene, fluorescein, sulforhodamine, phenoxazone, kiton red, eosin Y spirit, lanthanides and fluorescent semiconductor materials.

21. The endless belt or fabric of claim 20 wherein the sensor is further comprised of a scattering material selected from the group consisting of titanium dioxide, aluminum oxide, and poly(vinylidine fluoride).

22. An endless belt or fabric for use in a process control loop comprised of a belt and at least one sensor, wherein the sensor is placed at a preselected position on or in the belt or fabric, and the sensor emits electromagnetic radiation having a peak emission wavelength when excited by an energy source having a wavelength different from the peak emission wavelength.

* * * * *